US012712805B2

(12) United States Patent
Jennings

(10) Patent No.: US 12,712,805 B2
(45) Date of Patent: Aug. 18, 2026

(54) METHOD FOR DISTRIBUTING MULTIPATH FLOWS IN A DIRECT INTERCONNECT NETWORK

(71) Applicant: Rockport Networks Inc., Ottawa (CA)

(72) Inventor: Alan James Jennings, Kanata (CA)

(73) Assignee: Rockport Networks Inc. (CA)

(*) Notice: Subject to any disclaimer, the term of this patent is extended or adjusted under 35 U.S.C. 154(b) by 760 days.

(21) Appl. No.: 18/014,299

(22) PCT Filed: Jun. 8, 2022

(86) PCT No.: PCT/IB2022/000317
§ 371 (c)(1),
(2) Date: Jan. 3, 2023

(87) PCT Pub. No.: WO2022/259040
PCT Pub. Date: Dec. 15, 2022

(65) Prior Publication Data

US 2023/0261973 A1 Aug. 17, 2023

Related U.S. Application Data

(60) Provisional application No. 63/208,774, filed on Jun. 9, 2021.

(51) Int. Cl.
*H04L 45/24* (2022.01)
*H04L 47/34* (2022.01)

(52) U.S. Cl.
CPC .............. *H04L 45/24* (2013.01); *H04L 47/34* (2013.01)

(58) Field of Classification Search
CPC ......... H04L 45/24; H04L 47/28; H04L 47/34; H04L 49/506; H04L 49/55
See application file for complete search history.

(56) References Cited

U.S. PATENT DOCUMENTS 9,277,480 B2 3/2016 Kohli
9,965,429 B2 5/2018 Oprea
(Continued)

FOREIGN PATENT DOCUMENTS

EP 2109228 A1 10/2009
WO WO 2022/096927 A1 5/2022

OTHER PUBLICATIONS

International Search Report and Written Opinion dated Oct. 12, 2022, for International Application No. PCT/IB2022/000317, 11 pages.

*Primary Examiner* — Donald L Mills
(74) *Attorney, Agent, or Firm* — FBT Gibbons LLP

(57) ABSTRACT

Disclosed is a method of routing a flow of packets from a source node to a destination node over multiple pathways only when the destination node has determined and advised the source node that a packet reordering resource is available for use with multipath operation. Also disclosed is a method of detecting packet loss without incurring timeout delays when routing packets in a flow of packets over multiple pathways from a source node to a destination node. Further disclosed is a method of dynamically avoiding slower paths when routing packets between a source node and a destination node along multiple pathways. Also disclosed is a method of avoiding overflow of a destination node reorder window when routing packets between a source node and a destination node along multiple pathways.

11 Claims, 11 Drawing Sheets

| Skew Ctr 3 | Skew Ctr 2 | Skew Ctr 1 | Skew Ctr 0 | First RSN |
|---|---|---|---|---|
| 0 | 0 | **-1** | 0 | RSN 0 |
| 0 | **-1** | -1 | 0 | |
| **-1** | -1 | -1 | 0 | |
| **0** | -1 | **0** | **1** | RSN 1 |
| **-1** | -1 | 0 | 1 | |
| **0** | **0** | **-1** | **2** | RSN 2 |
| **-1** | **1** | **0** | **3** | RSN 3 |
| -1 | **0** | 0 | 3 | |
| -1 | 0 | 0 | **2** | |
| -1 | 0 | **-1** | 2 | |
| -1 | 0 | -1 | **1** | |

(56) References Cited

U.S. PATENT DOCUMENTS

| | | | | |
|---|---|---|---|---|
| 10,142,219 | B2 | 11/2018 | Oprea et al. | |
| 10,303,640 | B2 | 5/2019 | Oprea | |
| 10,693,767 | B2 | 6/2020 | Oprea et al. | |
| 11,483,232 | B1 * | 10/2022 | Matthews | H04L 45/38 |
| 12,278,763 | B2 * | 4/2025 | Vegesna | H04L 47/12 |
| 2017/0187629 | A1 * | 6/2017 | Shalev | H04L 45/72 |
| 2017/0346709 | A1 * | 11/2017 | Menon | H04L 45/70 |
| 2019/0068484 | A1 | 2/2019 | Oprea et al. | |
| 2021/0119930 | A1 * | 4/2021 | Debbage | H04L 1/1621 |
| 2024/0250919 | A1 * | 7/2024 | Goel | H04L 67/61 |

* cited by examiner

PRIOR ART

| RSN | LRD | next LRD |
|---|---|---|
| 0 | 4'b0000 | 4'b0001 |
| 0 | 4'b0000 | 4'b0011 |
| 0 | 4'b0000 | 4'b0111 |
| 0 | 4'b0000 | 4'b1111 |
| 1 | 4'b1111 | 4'b0001 |
| 1 | 4'b1111 | 4'b0101 |
| 1 | 4'b1111 | 4'b1101 |
| 2 | 4'b1101 | 4'b0001 |
| 2 | 4'b1101 | 4'b0011 |
| 2 | 4'b1101 | 4'b0111 |
| 3 | 4'b0111 | 4'b0001 |
| 3 | 4'b0111 | 4'b0011 |
| 3 | 4'b0111 | 4'b1011 |

| Skew Ctr 3 | Skew Ctr 2 | Skew Ctr 1 | Skew Ctr 0 | First RSN |
|---|---|---|---|---|
| 0 | 0 | -1 | 0 | RSN 0 |
| 0 | -1 | -1 | 0 | |
| -1 | -1 | -1 | 0 | |
| 0 | -1 | 0 | 1 | RSN 1 |
| -1 | -1 | 0 | 1 | |
| 0 | 0 | -1 | 2 | RSN 2 |
| -1 | 1 | 0 | 3 | RSN 3 |
| -1 | 0 | 0 | 3 | |
| -1 | 0 | 0 | 2 | |
| -1 | 0 | -1 | 2 | |
| -1 | 0 | -1 | 1 | |

METHOD FOR DISTRIBUTING MULTIPATH FLOWS IN A DIRECT INTERCONNECT NETWORK

FIELD OF THE INVENTION

The present invention relates to a method for routing packets in a direct interconnect network. More particularly, the present invention relates to a method for distributing multipath flows of packets in a direct interconnect network.

BACKGROUND OF THE INVENTION

One method of distributing packets from a source node S to a destination node D involves the use of source routing, wherein the source node determines the entire path that a packet must follow to reach the destination node. In this respect, a head flit header in a packet may be populated with a series of node ports to use, which defines the path through the network. In the case where a single flow is distributed over multiple paths, as shown in FIG. 1 (which displays multipath use in a direct interconnect network), such a path selection decision must be made for each packet. One problem with distributing over multiple paths, however, is that because the flow may be distributed along diverse paths of different lengths and different effective rates due to congestion, the packets may arrive at the destination node out of sequential order. This is particularly problematic when many applications, such as TCP and RoCEv2 RDMA, may be completely or partially intolerant to packet mis-ordering, causing sequence back-ups and requests to resend data.

Of course, in some implementations the destination nodes may be capable of reordering packets to the original sequence to prevent the foregoing issue. Packet reordering can be achieved using, for instance, a well-known technique of adding PSNs (Packet Sequence Numbers) to the packets in a flow, storing the received packets, and using a bit-map reorder window and pointer to track the PSNs and read the packets as stored in the correct order.

One issue with using this technique, however, is that the destination node must be capable of absorbing sufficient out-of-order packets to prevent mis-ordering. This requires careful design considerations involving multiple resources, including: a packet memory pool capable of holding all received packets for both ordered and misordered flows; a sufficient number of reorder windows (i.e. the number of incast flow sources that can be processed at once); and a sufficiently sized reorder window (which limits the out-of-order degree for a single reorderable flow). Exceeding the limits of any of these resources will cause delays or packet mis-ordering.

U.S. Pat. Nos. 10,142,219 and 10,693,767 to Rockport Networks Inc., the disclosures of which are incorporated herein by reference, disclose methods of sending packets in a direct interconnect network from a source node S to a destination node D over multiple diverse paths. The packets are divided into flits, which may be sent over the network links using wormhole switching techniques, and may require re-ordering at the destination node D. More particularly, one of the disclosed methods comprises discovering all nodes and all output ports on each node in a network topology; including the discovered nodes and output ports in the network topology in a topology database in order to allow the nodes and ports to be included in shortest or disjoint path routing computations; calculating the shortest or disjoint paths from every output port on each node to every other node in the network topology based on those nodes and output ports contained in the topology database; generating a source routing database on each node containing the shortest or disjoint paths from every output port on each node to all other nodes in the network topology; receiving packets at the source node; sending the received packets to the output ports of the source node in a round robin, weighted round robin, random distribution or other calculated path selection process, whereby each of the received packets is thereafter segmented into flits at the output port of the source node and distributed along the shortest or disjoint path from the output port on the source node to the destination node using worm-hole switching, such that the packets are thereby distributed along alternate routes in the network topology; and re-assembling and re-ordering the packets at the destination node so that the packets accord with their original form and order.

The present invention seeks to improve upon the various techniques disclosed in U.S. Pat. Nos. 10,142,219 and 10,693,767 by providing methods of routing packets in a direct interconnect network that seek to provide one or more of the following advantages, namely: preventing packet mis-ordering when multipath flows to a single destination would exceed that destination's reordering window resources; detecting lost packets without waiting for long timeouts; and dynamically avoiding excessive skew between paths to control and reduce reorder window sizes and packet storage requirements.

The techniques disclosed herein are intended to minimize the total amount of additional metadata required to be passed with the packets and do not require the use of timestamps or network synchronization techniques to be employed, while achieving packet loss detection and dynamic path distribution functionality.

SUMMARY OF THE INVENTION

In one embodiment, the present invention provides a method of routing a flow of packets from a source node to a destination node comprising the steps of: at the source node, determining if the flow of packets is eligible for distribution along multiple pathways between the source node and the destination node; if the flow of packets is not eligible for such distribution, then routing the entire flow of packets over only one pathway between the source node and the destination node, but if the flow of packets is eligible for such distribution, then commencing routing the flow of packets over only one pathway between the source node and the destination node, and including a request for multipath operation in metadata contained in a packet of the flow of packets; at the destination node, upon detection of a request for multipath operation in metadata contained in the packet of the flow of packets, determining if a reordering resource is available for use with multipath operation; if no reordering resource is available, then receiving the flow of packets over only one pathway between the source node and the destination node, but if a reordering resource is available, then allocating the reordering resource for the flow of packets, and sending a grant code in a control flit to the source node; at the source node, upon detection of the grant code in the control flit, distributing the flow of packets along multiple pathways between the source node and the destination node, whereby the destination node uses the available reordering resource to reorder packets from the flow of packets.

In another embodiment, the present invention provides a method of detecting packet loss without incurring timeout delays when routing packets in a flow of packets over multiple pathways from a source node to a destination node comprising the steps of: routing the packets in the flow of packets along multiple pathways from the source node to the destination node, wherein each packet comprises a packet sequence number denoting a sequential location of said packet within the flow of packets, and wherein the source node records the packet sequence number for each packet sent on each pathway within the multiple pathways in order to track the sequence of packets sent on each pathway within the multiple pathways, and wherein each packet further comprises a previous packet sequence number denoting the packet sequence number of an immediately prior packet sent on a same pathway within the multiple pathways; for each packet that arrives at the destination node, setting a bitmap bit within a window bitmap that corresponds to the packet sequence number of said packet, and determining if a bitmap bit within the window bitmap that corresponds to the previous packet sequence number has been set; and if the bitmap bit corresponding to the previous packet sequence number has been set, then normal packet processing proceeds, but if the bitmap bit corresponding to the previous packet sequence number has not been set, then the packet that corresponds to the previous packet sequence number was lost and cannot be retrieved, and packet processing proceeds without incurring a timeout.

In yet another embodiment, the present invention provides a method of dynamically avoiding slower paths when routing packets between a source node and a destination node along multiple pathways, said method comprising: commencing routing the packets from the source node to the destination node along multiple pathways, and including metadata with the packets describing the routing distribution of the packets along the multiple pathways, said metadata comprising a number of packets sent on each pathway within the multiple pathways; monitoring relative packet skew between the multiple pathways at the destination node, wherein the destination node counts the number of packets that arrive on each pathway within the multiple pathways, compares the number of packets that arrive on each pathway to the number of packets sent on each pathway as per the metadata, and determining path skew status based on this comparison; using a backwards multipath control flit mechanism to send the path skew status from the destination node to the source node; and implementing a weighted path distribution mechanism at the source node to dynamically reduce the use of or avoid any skewed pathways in the multiple pathways when routing packets from the source node to the destination node along multiple pathways.

In yet a further embodiment, the present invention provides a method of avoiding overflow of a destination node reorder window when routing packets between a source node and a destination node along multiple pathways in a network, said method comprising: attaching a packet sequence number (PSN) to each packet at the source node as metadata and maintaining said metadata when routing each such packet through the network until each such packet is read from a receive packet buffer memory at the destination node; using the PSN of each such packet read from the receive packet buffer memory at the destination node as a credit PSN (CPSN) and sending said CPSN from the destination node to the source node as control flit metadata; at the source node, comparing the CPSN to a latest PSN for packets sent from the source node to the destination node, and using the difference between the CPSN and such latest PSN as a measure of a number of packets queued in the source node, in-flight in the network, or queued in the destination node reorder window; and, if the difference between the CPSN and such latest PSN exceeds a programmable limit, halting the routing of packets along multiple pathways from the source node to the destination node to prevent overflow of the destination node reorder window.

BRIEF DESCRIPTION OF THE DRAWINGS

The embodiments of the invention will now be described, by way of example, with reference to the accompanying drawings in which.

DETAILED DESCRIPTION OF THE INVENTION

Figure 1:
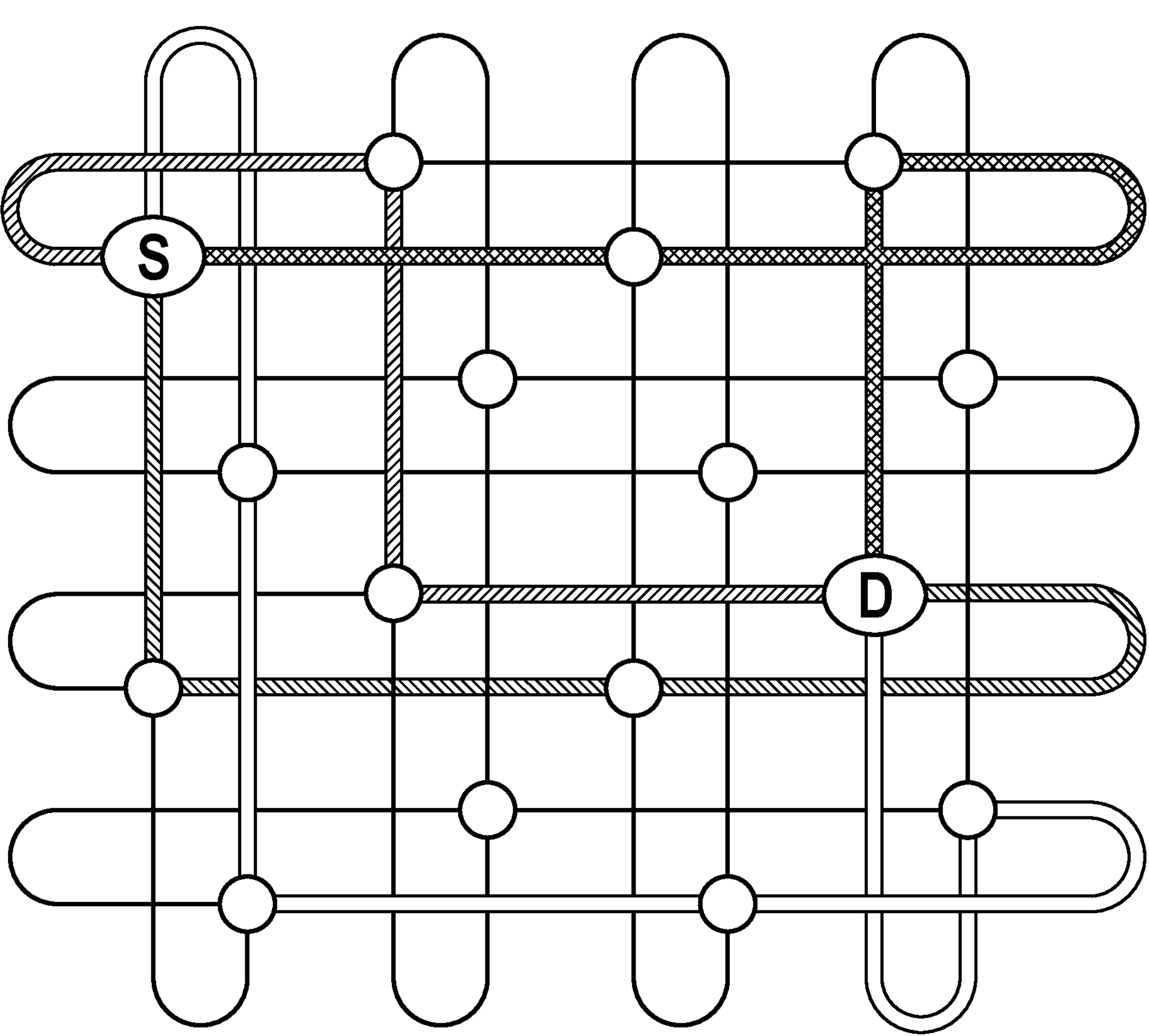
FIG. 1 is a diagram showing example multipath flows from a source node S to a destination node D in a direct interconnect network.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention seeks to address one or more issues that arise with the use of multipath flows between source and destination nodes, particularly when packet reordering is necessitated by the use of multipath flows.

In one embodiment, the present invention provides methods to improve the implementation of multipaths flows. One such method can be described with reference to FIG. 2, which shows preferred functionality involved in an example multipath direct interconnect system, which in this example comprises, for ease of explanation, a single source node, a single destination node, and intermediate nodes therebetween that are capable of providing a variety of paths from source to destination. In this respect, with reference to FIG. 2, the following general functionality may be involved in a preferred method:

In the Source Node

1. One or more transmit packet buffer stages (two shown in this example), as would be known by persons skilled in the art;
2. A packet distribution function (preferably within transmit buffering) that will identify multipath flows and distribute them over the available paths using a preferred distribution method;
3. A Packet-to-Flit (P2F) conversion function that will employ the known technique of segmenting packets into flits for wormhole switching in a direct interconnect or other network. This function will additionally provide a method to carry multipath metadata along with the original packet data. In a direct interconnect network this may be achieved, for instance, by using appropriate field(s) in the Head Flit header;
4. A flit switch function that will arbitrate and switch flits between a multitude of ports in a direct interconnect or other network (also used in the destination node);

In the Intermediate Nodes

5. Flit forwarding functionality within the number of intermediate nodes connected in the network topology, which provides a multitude of possible paths from the source node to destination node;

In the Destination Node

6. A known Flit-to-Packet (F2P) conversion function to reassemble flits back into packets;
7. A function to write (wr) packets into a Receive Packet Buffer Memory using references (pointers and metadata), herein referred to as Packet Handles (PH), using any technique known to persons skilled in the art;
8. A complementary function to read (rd) packets from the Receive Packet Buffer Memory and send them to the host when the PHs are passed back in-order;
9. A Reorder Manager (ROM) function that will receive PHs and additional multipath-related metadata from the Receive Packet Buffer Memory in the arbitrary order in which they were received, and return these PHs again in the correct order, with other possible metadata;
10. In a preferred embodiment, the ROM may contain bitmap data structures and a Packet Handle Table (PHT) to implement the reordering function (function #9 above), while using Previous Packet Sequence Number (PPSN) metadata to detect lost packets;
11. In a preferred embodiment, the ROM may contain per-window, per-path skew counters and a Credit Packet Sequence Number (CPSN) tracking mechanism;
12. The Receive Packet Buffer Memory may receive additional CPSN metadata along with the PHs, and return the CPSN to the ROM after the packets are read from the memory;
13. An interface from the ROM to pass metadata to a control flit creation and formatting function, which will encapsulate this into Multipath Control Flits (MCF) that are sent back to the source node; this metadata includes CPSN, and per-path skew counter values, in addition to other identifying multipath context metadata such as destination node numbers;

In the Intermediate Nodes

14. Backwards MCFs pass through the network (intermediate nodes) to the source node;

In the Source Node

15. A MCF extraction function that receives the flits from the flit switch and extracts the multipath metadata, passing it to the consuming functions, with the CPSN going directly to the packet distribution function and the skew counters going to the Skew Counter to Path Weight function;
16. A Skew Counter to Path Weight Conversion function, that will provide the path distribution function with dynamically calculated path weights.

Figure 3:
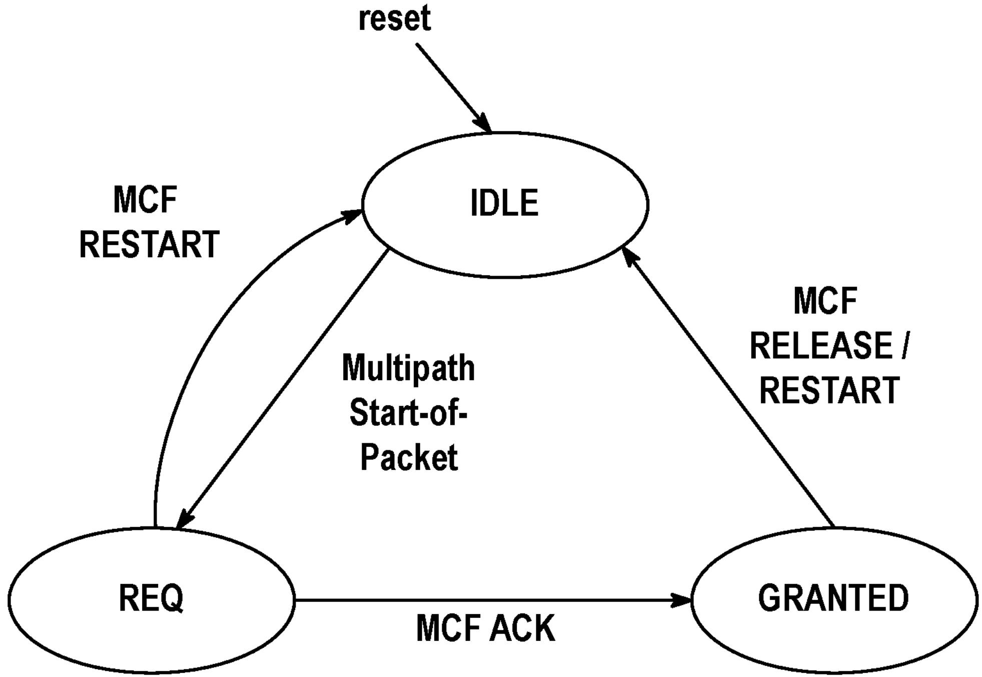
FIG. 3 is a diagram showing a source node's multipath Finite State machine.

Further details of this functionality are provided below. Firstly, however, it must be noted that the required multipath metadata transferred with a packet between source and destination nodes includes, but may not be limited to, the following:

- The source node identification number;
- A path identification number (Path ID) indicating which path from source to destination was used;
- The source multipath flow state: IDLE, REQ, or GRANTED, as shown in FIG. 3;
- A Packet Sequence Number (PSN), monotonically incrementing per packet, in a unique scope for each active flow to each destination;
- A Last Round Distribution vector, indicating the paths that were used in the previous round of packet distribution over the set of unique paths being used for the multipath flow;
- A Round Sequence Number, which is monotonically incremented per distribution round;
- A Previous Packet Sequence Number (PPSN), indicating the PSN of the previous packet sent down the same Path ID; and
- PPSN Valid flag, indicating that the PPSN field is valid.

A first issue that often arises in multipath systems relates to re-ordering window allocation. In particular, there are generally a finite number of reordering window data structures available at any destination node. As such, if the number of multipath flows requiring packet reordering exceeds the available resources, then packets may be dropped or mis-ordered.

In order to prevent this from happening, in one embodiment the present invention may provide the functionality to dynamically connect source nodes to destination reorder windows. To invoke this method, a source node must firstly be capable of identifying which flows will be treated as multipath-capable, based on selectable criteria such as Class of Service, priority, protocol type, or other applicable criteria. With such capability, the source node may choose to identify any or all flows as being multipath-capable. For example, all RoCEv2 flows might be designated as multipath, while other TCP control flows might be designated to use a single path.

In operation, with this functionality, the skilled person can seek to ensure that adequate reorder window data structures are available for all multipath flows. In particular, as a general overview, when a source node S receives packets for a flow that it selects as being eligible to distribute over multiple paths, it will at first send the packets over only one selected path, while requesting multipath operation via optional metadata contained in the Head Flit header, for instance. When the destination node D receives the first packet of the flow, and sees a metadata request for multipath operation, the destination node D will allocate a reordering window (only if such resource is available) and send back a window grant code in a control flit to the source node S. This will assist in ensuring that adequate reordering window data structures are available to reorder the packet flow if necessary. Only when the source node S receives the window grant code in a control flit will it actually commence multipath distribution.

The source node must be capable of maintaining a state for each active flow to each destination. In this respect, for each flow, the source node's path distribution function may employ a Finite State Machine using the states IDLE, REQ, and GRANTED, as shown in FIG. 3. For a given flow, this means that either multipath routing is not being used for a given flow (i.e. IDLE), multipath routing has been requested for a given flow but has not yet been granted by the destination node (i.e. REQ), or multipath routing is available to be used for a given flow (i.e. GRANTED). The source node may maintain any number of these sets of state for each supported flow.

The destination node's Reorder Manager (ROM) function must also be capable of maintaining a limited number of reorder windows which can be dynamically assigned to specific source node multipath flows. For each reorder window various data structures and state information will be maintained. The reorder windows may be assigned based on active requests or based on other configured criteria. Windows may be released due to inactivity using a timeout mechanism, or any other criteria such as volume of traffic, or under network management control.

Figure 4:
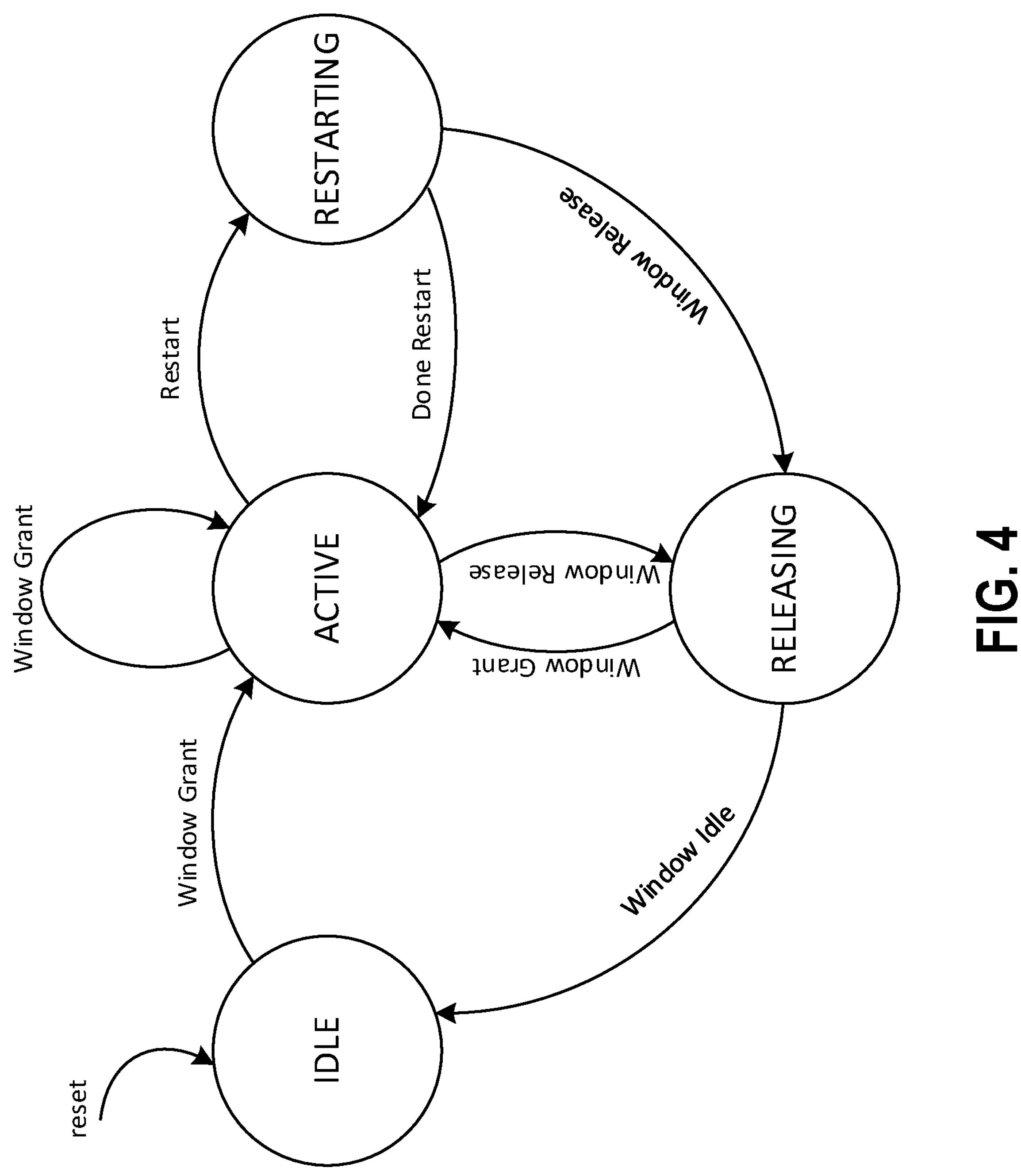
FIG. 4 is a diagram showing a destination node's multipath Finite State machine.

In this respect, for each flow, the destination node's Reorder Manager (ROM) function may employ a Finite State Machine using the states IDLE, ACTIVE, RELEASING, and RESTARTING as shown in FIG. 4. In the IDLE state a reorder window is unused. In the ACTIVE state a window has been granted to a flow and will be actively reordering packets. In the RELEASING state the window has sent an indication to the source that it plans to release the window. In the RESTARTING state the reorder window is performing a packet flushing operation to recover from error conditions.

Figure 5:
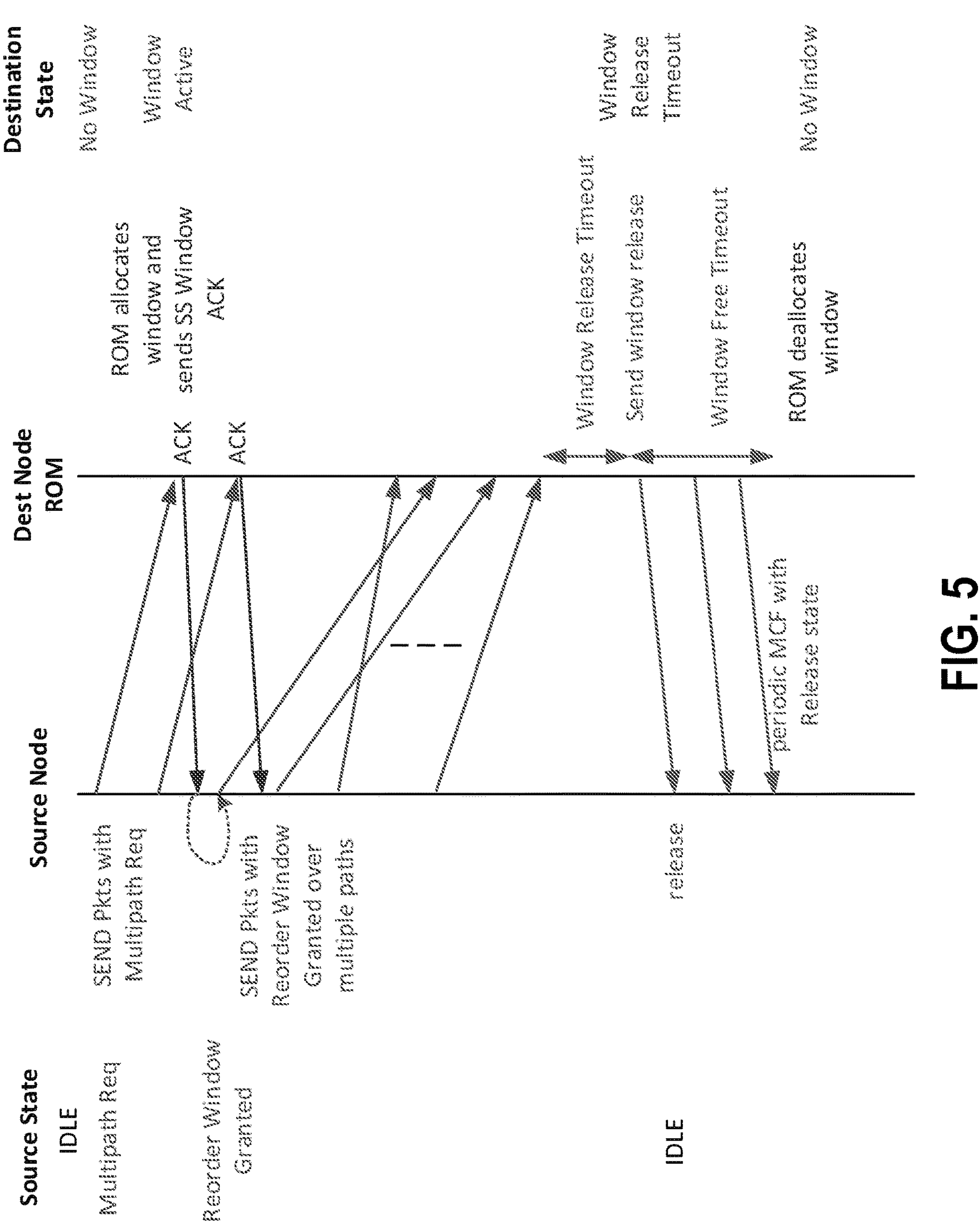
FIG. 5 is a protocol diagram showing a source to destination multipath request protocol.

FIG. 5 is a protocol diagram showing an example exchange of information between a source node's packet distribution function and a destination node's ROM function enabling the above-described functionality. The source active flow state will start in IDLE and transition to REQ when it sees a multipath-capable packet to send. The source active flow state is sent as additional multipath metadata only on all multipath capable packets. The source will initially send all the packets for the flow over a single path using any selection criteria, such as the hashing of packet header fields. If the destination node ROM can allocate a reorder window it will transition from IDLE to an ACTIVE state and indicate this using backwards Multipath Control Flits (MCF) to the source. Once the source receives the acknowledgement it will transition the flow state to GRANTED state and commence multipath distribution of the flow.

Since reorder windows are a finite resource, the ROM may release the reorder window so that it may be reused by other requesting resources, based on any criteria such as traffic volume or timeouts. On entering the RELEASING state, a release message will be sent, and after a window free timeout the window will be freed. This two-stage timeout prevents mis-ordering in the case where the source node starts to send packets as the release message is being sent.

Some network errors such as the failure of intermediate links or nodes used for multipath paths may cause excessive packet loss and abnormal reordering conditions. To recover from any out of bounds events the ROM can move to the RESTARTING state. This will signal a restart message which will force the MPP back to its IDLE state to restart the process. While in the RESTARTING state the ROM will send all received packets in order but will not wait for any missing packets within the reorder window. When the ROM receives the first packet for the flow marked again as REQ, and this reaches the head of the window, the ROM FSM will return to the ACTIVE state.

Figure 6:
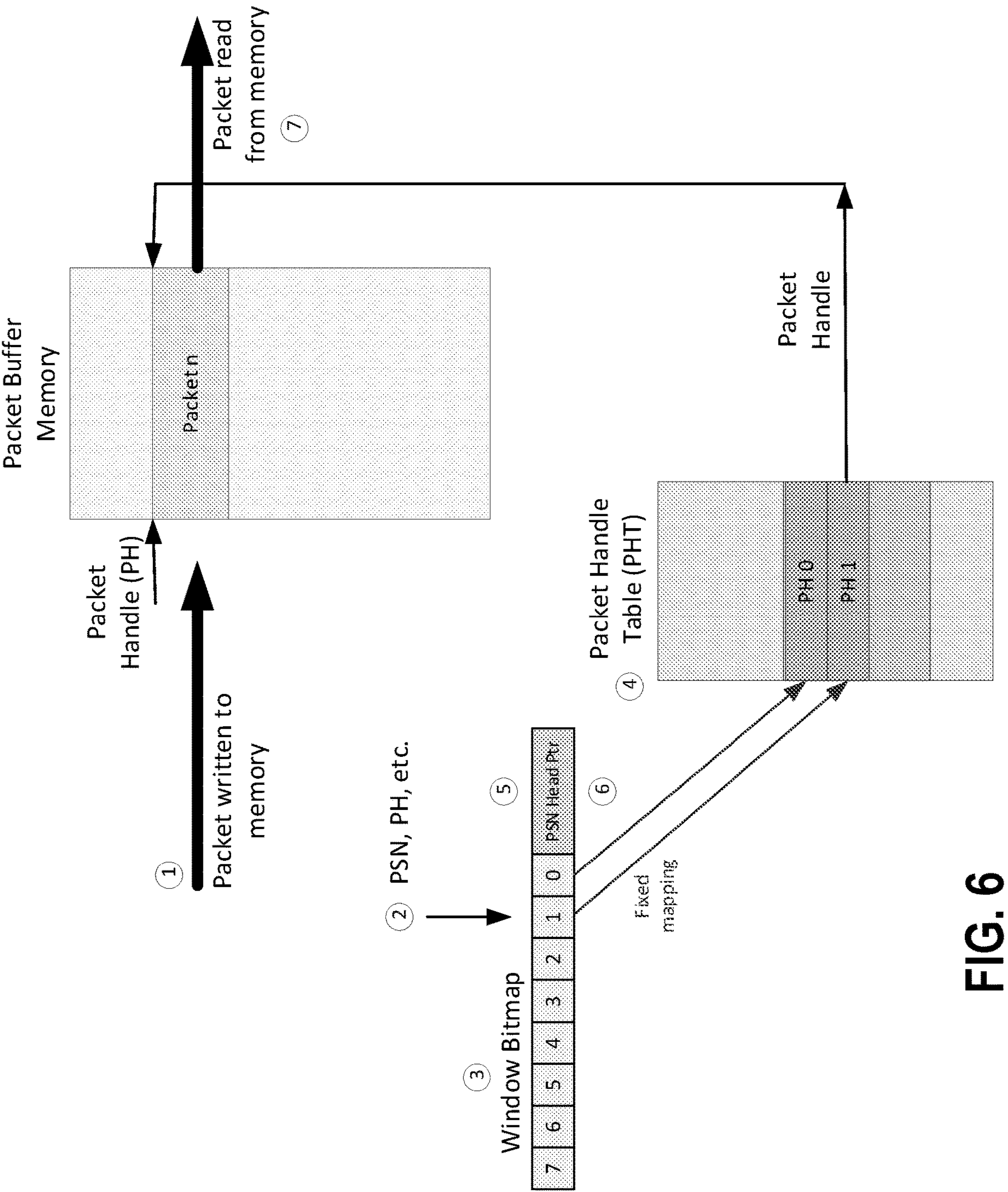
FIG. 6 is a diagram showing the destination node Reorder Manager (ROM) data structure to reorder a window.

A preferred implementation of the ROM packet reordering method for a reorder window is explained with reference to FIGS. 6 and 7, although other similar methods may be employed without loss of generality. In FIG. 6, the packets are processed as follows:

1. Each packet is written into the receive packet buffer memory in such a manner that it may be retrieved again using a pointer reference, here called a Packet Handle (PH).
2. The PH is passed to the ROM function along with other metadata for the packet such as the reorder Packet Sequence Number (PSN) added in the source packet distribution function.
3. The ROM will select the allocated reorder window and process the packet with a data structure consisting of a window bitmap, a PSN Head Pointer (PHP), and a Packet Handle Table (PHT). The PHP tracks the position of the next PSN value that is required for in-order delivery of packets. The sliding window bitmap will preferably reference a log 2 (window size) bit range within the PSN space. The PHP marks one end of this range as it sweeps though PSN space. For a PHT value P and window of size W, the window represents the range from P to P+W. Setting a bit indicates that the packet has been received.
4. The Packet Handle Table (PHT) is used to store the PH for a packet at the PSN value marked in the reorder window, so there is a fixed, implicit mapping between a window bitmap bit and a single PHT entry.
5. The PSN of the arriving packet is compared with a PHP to determine if the packet is within the current reorder window space, and if so, the corresponding bit is set and the PH stored in the corresponding PHT entry.
6. When the bitmap bit is set for the entry pointed to by the PHP the packet may be released since it is in order. To release a packet the PHP value is incremented and the bitmap bit is cleared.
7. The released packet PH is read from the PHT and the packet may be retrieved from packet buffer memory and sent to the host.

Figure 7:
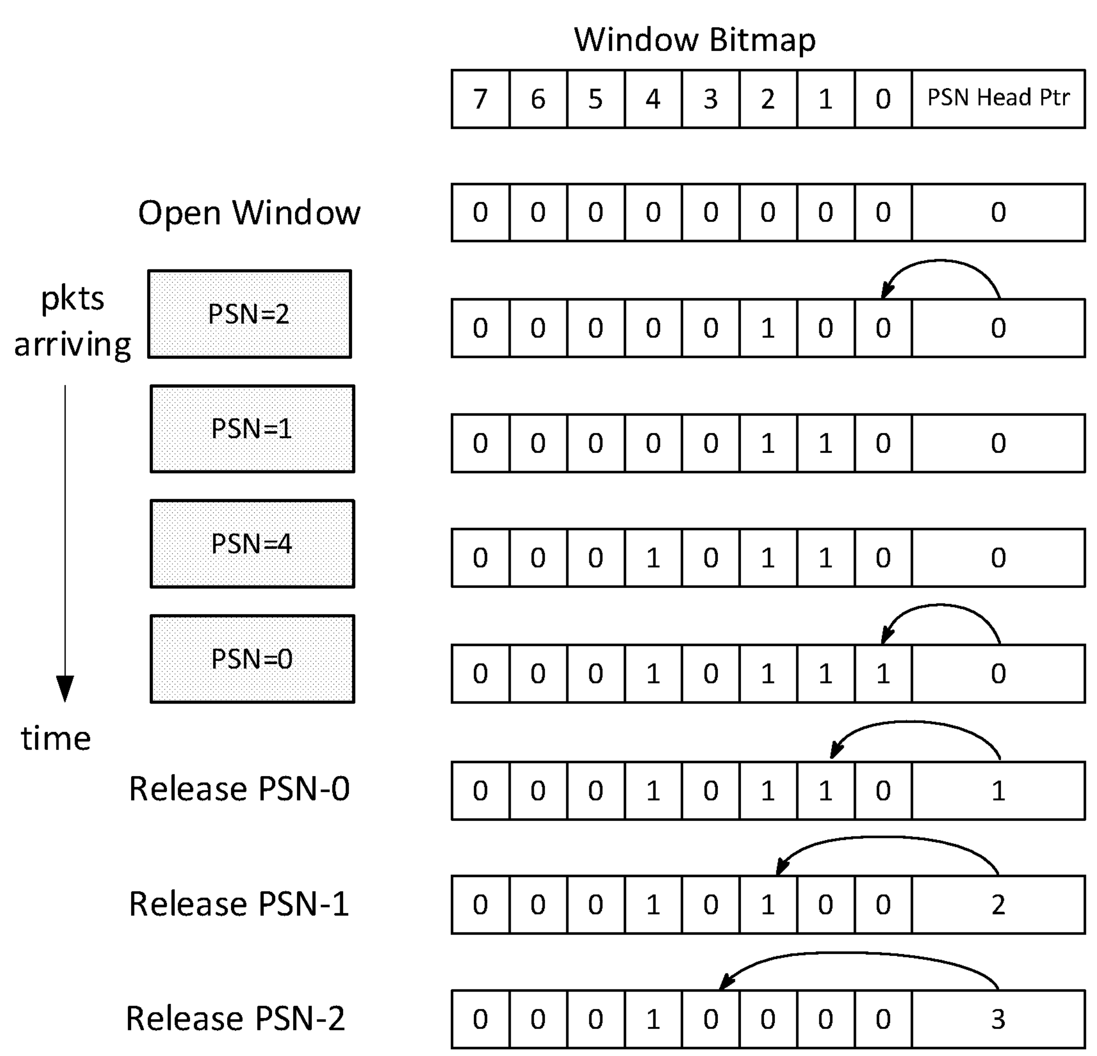
FIG. 7 is a diagram showing an example of the use of window bitmaps for reordering packets.

FIG. 7 provides an example of the operation of a window bitmap for reordering packets. The example sequence of events proceeds from top to bottom chronologically. In this example the multipath flow has already been established, but reorder window is empty with all bits in the bitmap cleared, and the PHP is set to expect a packet with a PSN value of 0 (for clarity only). In this example, packets arrive out of order. A first packet arrives having a PSN value of 2, so the window bitmap at position 2 is now accordingly set to "1". A second packet arrives having a PSN value of 1, so the window bitmap at position 1 is now accordingly set to "1". A third packet then arrives having a PSN value of 4, so the window bitmap at position 4 is now accordingly set to "1". When the fourth packet arrives having a PSN value of 0, the window bitmap at position 0 is set to "1". The PHP, having initially been set to wait for arrival of the first packet (i.e. until window bitmap position 0 is set to 1), can then process all those packets in sequence starting from window bitmap position 0 wherein the window bitmap has been set to 1. In this example, this means that the packets with the PSN set to 0, 1, and 2 can be processed and released in order. Specifically, the packet with PSN set to 0 is released first, and the PHP is increased by one to bitmap position 1. Because bitmap position 1 is also set to 1, the packet with PSN set to 1 is then released, and the PHP is increased by one to now point to bitmap position 2. Next, because bitmap position 2 is also set to 1, the packet with PSN set to 2 is then released, and the PHP is increased by one to now point to bitmap position 3. However, at this point, because window bitmap position 3 is set to 0, the PHP will remain at value 3 either waiting for the packet with the PSN set to 3 to arrive or until it is declared lost. Note that in a more representative example the PHP would initially be set to PSN value of the first packet that triggered the window grant, and not to zero.

A second issue that arises when packet reordering is necessitated by the use of multipath flows relates to detection of packet loss (i.e. packets failing to reach the destination node D), causing timeouts. In any optical network there is the possibility of packet loss due to optical bit error rates or network congestion, for instance. The problem is exacerbated when re-ordering is needed for multipath flows, because if a packet never arrives, at some point the packet must be declared lost, the reordering function may have to be terminated depending on the application (particularly if multiple packets have been lost), and data transmission must otherwise continue.

A well-known technique to assist in overcoming problems associated with lost packets is to use a timeout mechanism. However, the disadvantage of timeouts is that the reorder process may be stalled for an unacceptable period of time, thereby requiring a large reorder window and packet memory.

Therefore, in another embodiment, the present invention provides a method of detecting packet loss on multipath flows that avoids using timeouts in cases of isolated lost packets. The method assumes that on a given path, the packets from a flow will be in order and cannot pass each other (i.e. there would only be mis-ordered packets between flows sent over different pathways). Thus, if a loss of sequence can be detected on a particular path, it is clear that a packet has been lost and there is no need to use a timeout to wait for the lost packet. With this assumption, the method, in general, is implemented as follows:

1. For each packet, send the PSN (Packet Sequence Number) of the previous packet sent on the same path (i.e. the “Previous PSN” or “PPSN”); a PPSN valid flag is also included.
2. If the packet pointed to by the PPSN is within the reorder bitmap then it has not arrived at destination node D, was clearly lost and may be recorded as such. The bitmap bit can be set indicating that the packet is accounted for, and a NULL value written into the Packet Handle Table.
3. When the window head pointer gets to the lost packet position (or if already waiting for that packet), then packet processing can move on immediately without incurring a timeout. When the PHT is read the NULL value indicates that there is no packet to retrieve.
4. If multiple consecutive packets sent on the same path are lost, then a timeout will need to be incurred, as the first packet lost cannot be detected with this method. But if lost packets on a path are separated by good packets on the same path, then the lost packets will still be detected.
5. The PPSN valid flag indicates that the PPSN is valid and would not be set for the first packet sent to each path at the start of multipath distribution. If a packet arrives with the PPSN valid bit not set then PPSN processing is not performed.

Figure 8:
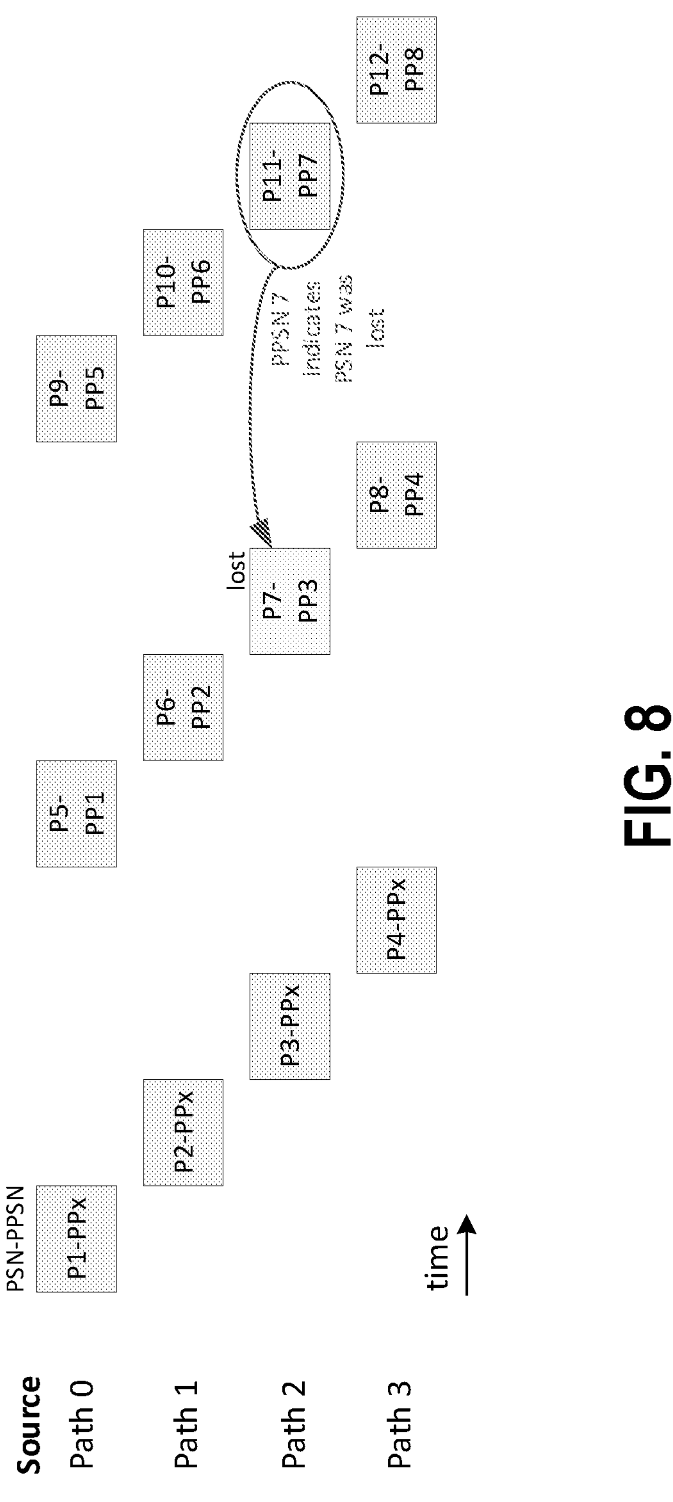
FIG. 8 is a diagram showing an example of the use of Previous Packet Sequence Numbers (PPSNs) to detect lost packets.

FIG. 8 provides an example showing the use of PPSNs to detect lost packets. In this example, the packets are sprayed over 4 paths (Path 0, Path 1, Path 2, and Path 3), and each sent packet is denoted as comprising both a PSN and PPSN. Here, the first packet or packet #1 (i.e. PSN=P1) is sent on Path 0, and the PPSN valid flag has not been set because no prior packet has been sent on this path. The second packet or packet #2 (i.e. PSN=P2) is sent on Path 1, and the PPSN for this packet has not been set because no prior packet has been sent on this path either. The same applies to the third and fourth packets sent on Paths 2 and 3 respectively. The fifth packet (i.e. PSN=P5) is sent on Path 0, and the PPSN is set to previous packet #1 (i.e. PPSN=PP1) because that is the packet that was the immediate predecessor packet sent on Path 0. In this example, the seventh packet or packet #7 (i.e. PSN=P7) sent on Path 2, and that has its PPSN set to packet #3 (i.e. PPSN=PP3), is lost in the network due to optical bit errors. When the next packet, packet #11 (i.e. PSN=P11), arrives from Path 2 it has its PPSN set to 7 (i.e. PPSN=PP7), but the window bitmap at position 7 will show that packet #7 (i.e. PSN=P7) has not arrived, and thus can be considered lost. The bitmap bit 7 can accordingly be set to 1 (and the corresponding entry in the PHT can be written with a NULL value), thereby allowing normal PHP processing to continue (i.e. allowing subsequent packets in the flow to be released) without incurring a timeout.

Figure 9:
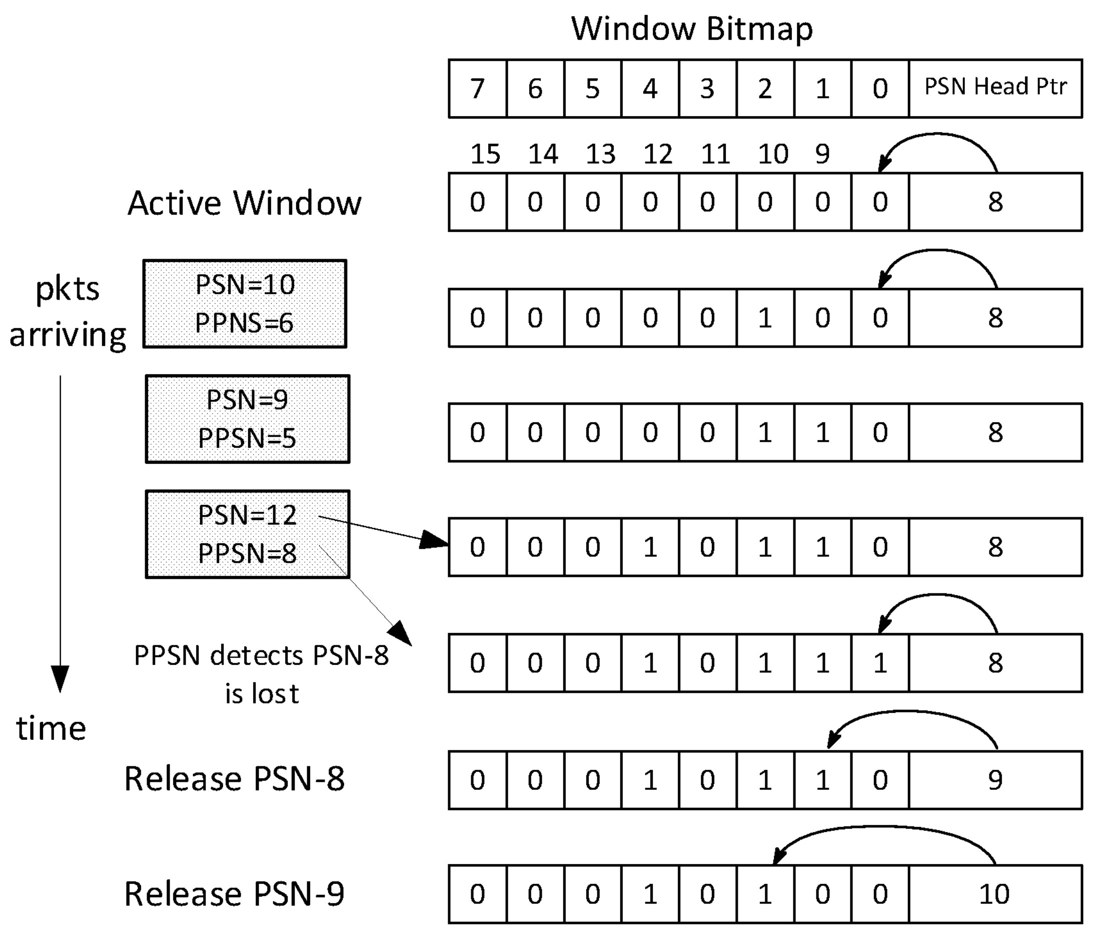
FIG. 9 is a diagram showing another example of the use of window bitmaps for reordering packets, while using PPSNs to detect lost packets.

FIG. 9 provides a further example of the operation of a window bitmap for detecting lost packets while using the PPSN mechanism. The example sequence of events proceeds from top to bottom chronologically. Firstly, the active window bitmap has all bits cleared, and the PHP is expecting a packet with a PSN value of 8. In this example, packets arrive out of order. A first packet arrives having a PSN value of 10, so the window bitmap at position 10 is now accordingly set to “1”. A second packet arrives having a PSN value of 9, so the window bitmap at position 9 is now accordingly set to “1”. For both these two packets the PPSN was behind the Packet Head Pointer and had already been processed, which is a normal case. A third packet then arrives having a PSN value of 12, so the window bitmap at position 12 is now accordingly set to “1”. When the PPSN is processed it indicates that the packet with the PSN of 8 was sent on the same path. Since PSN 8 has not arrived but the next packet on the same path has, it means that this packet can be declared lost and the bitmap bit at location 8 can be set. The PHT entry for PSN 8 will be set to NULL. The bits set in the bitmap at locations 8 and 9 allow the PHP to be incremented, moving past the lost packet and releasing the packet with PSN 9 without incurring a timeout for the last packet.

To implement the above described PPSN mechanism the source node S will need to keep track of the PSN values sent to each path so that it can populate the PPSN field the next time the same path is selected. Since the PSN space will be of finite size, and a given path may not be selected for a period of time in the path selection function, due to path weighting, path recalculations, or for other reasons, then the PSN space may wrap around, thus making the stored PSN-per-path state invalid. This case may be detected by comparing the stored PSN-per-path values with the current PSN and invalidating the entries. The invalid PPSN is indicated in the metadata PPSN valid flag sent with the PPSN to the destination node D.

A further issue that arises when packet reordering is necessitated by the use of multipath flows relates to congestion. Congestion at intermediate nodes may cause rapid backup of source and destination packet buffering due to the nature of worm-hole routing in a direct interconnect network. If a packet flow is distributed over multiple paths and some paths are more congested than others resulting in differences in throughput, then the packets on the faster paths will accumulate in the destination buffers and the packets assigned to the slower paths may back up into the source buffers. It is thus desirable to dynamically avoid slower paths when distributing packets over multiple paths in order to avoid congestion. To make best use of the available bandwidth the paths should be used in accordance with their effective throughput.

The destination node is also preferably capable of detecting any skew between paths and signaling this information back to the source node. In order to have such capability, the destination node is capable of counting how many packets have arrived on each path by using a Path Index field in the flit header, as well as knowing how many packets were sent on each path (in order to be able to detect path skew). Without this capability, if the source node is dynamically avoiding congested paths, then the destination node cannot know on which path a packet(s) it is waiting for will arrive. As such, the present invention may preferably involve a method that includes the following functionality: a method for the source node to send additional metadata describing the distribution of packets; a method for the destination node to monitor the relative packet skew on paths and to accordingly determine path skew status; a backwards Multipath Control Flit (MCF) mechanism capable of passing the path skew status to the source node; and a method for the source node to implement a weighted path distribution mechanism to dynamically reduce the use of, or avoid, any excessively skewed paths.

The required multipath metadata transferred between the destination node D and the source node S in the MCF includes, but is not limited to, the following:

- The destination node identification number (source of the MCF);
- An active flow identification number;
- A Credit Packet Sequence Number (CPSN) indicating the PSN of the last packet read from the receive packet buffer memory; and
- A set of per-path skew counter values.

To control the total number of packets in-flight or occupying a reorder window, the destination node will preferably send the CPSN values to the source node, where it can limit the number of packets sent based on the difference between its current PSN value and the CPSN received from the destination node.

Figure 2:
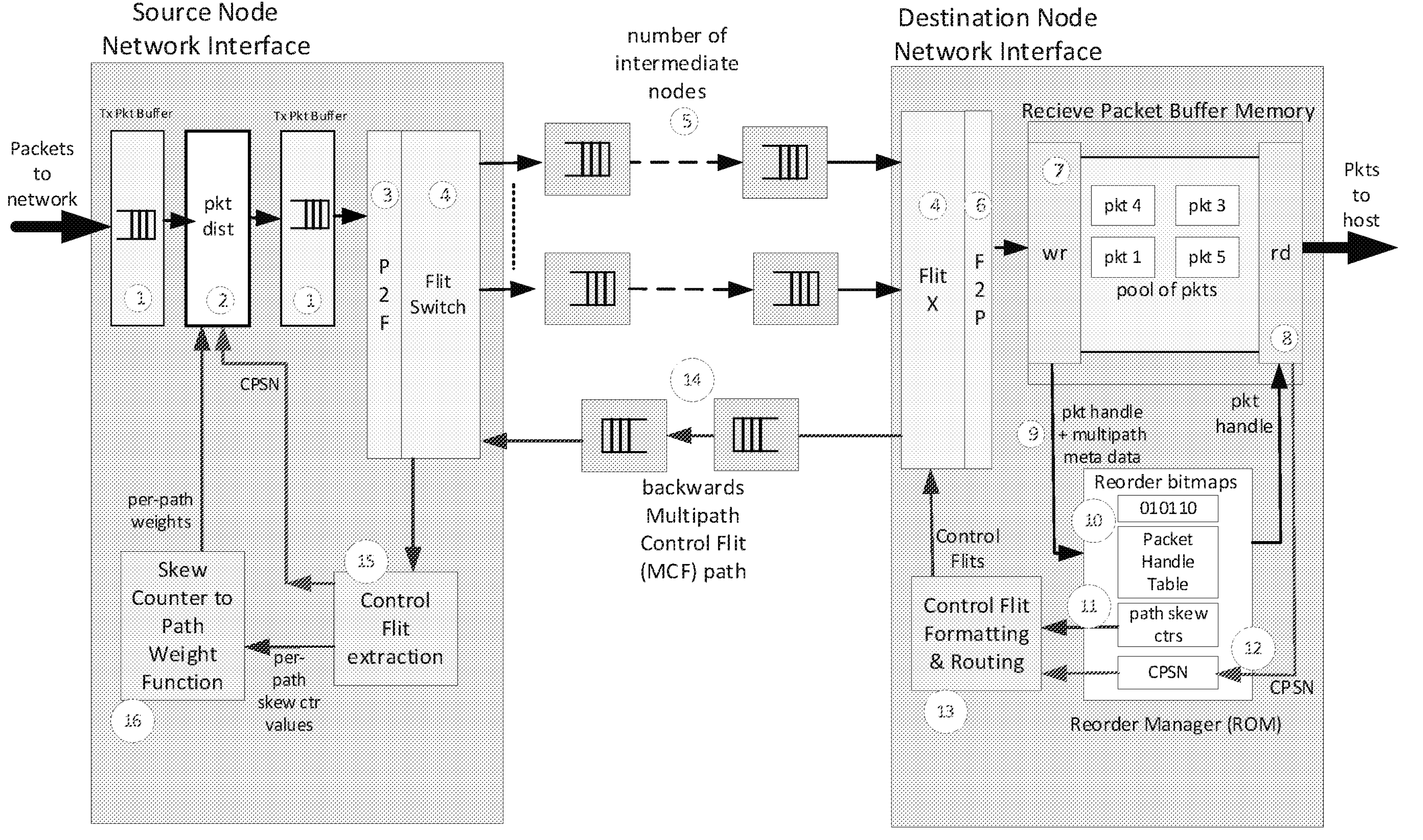
FIG. 2 is a diagram showing components in an example multipath distribution and reordering system.

In one embodiment, and with reference to steps (2) to (16) as shown in FIG. 2, a method for relative path skew detection may include the following steps and/or functionality:

1. Divide the path distribution (e.g. weighted round robin, weighted random distribution or other calculated path selection process) into "rounds", where each round consists of one cycle through the available paths. A round may contain, for example, between 1 and 8 packets, if using a maximum of 8 paths. Whether a packet is sent on a given path or not will be determined by the path weighting, which will alter the distribution over a set of rounds;
2. For each round distribution, record which paths had packets sent on them;
3. In each distribution send with every packet the previous round's distribution as: a Last Round Distribution (LRD) vector (e.g. 8-bits); and a Round Sequence Number (RSN e.g. 12-bits) that is incremented with each new round. The same LRD value is sent down every path used in the next round with the same RSN;
4. The destination node will consume the first LRD that arrives for a round, on whichever path it arrived first, and ignore all others for the same round. Since it is possible that RSNs may arrive out of order, a tracking window may be used to detect this, and each round may be marked as being accepted for the first LRD consumed. Therefore, at the destination node, for each reorder window maintain: an RSN pointer and bitmap tracking window, e.g. using the same bitmap technique described earlier to track packet arrival; and a set of per-path skew counters;
5. Use the skew counters at the destination node as follows: on the arrival of the first LRD for a round from any path (whichever one arrived first) increment the path counter for each path that had a packet sent on it (i.e. LRB bit set); for each packet that arrives, including ones that are not the first LRD, decrement the path counter for the path it arrives on; if the PPSN mechanism detects a lost packet on a path also decrement the counter for that path as that is equivalent to the packet arriving. The increments to each path skew counter represent packets that were sent on the path, while the decrements are packets that arrived on that path (or declared lost). The value in the skew counter is a measure of the packets currently in-flight on that path;
6. The difference between the per-path skew counters indicates the relative packet arrival skew between the paths. The current state of the skew counters is sent periodically to the source node in the multipath control flits;
7. When a reorder window is first allocated all the skew counters should be reset; and
8. In the case where multiple packets have been lost in order on a single path resulting in timeouts, the packet skew will maintain a static offset. This is recovered if the flow goes idle and the reorder window is returned to the free pool. If the skew becomes excessive and exceeds a programmable threshold the destination node can send a RESTART request which will reset the multipath flow.

Figure 10:
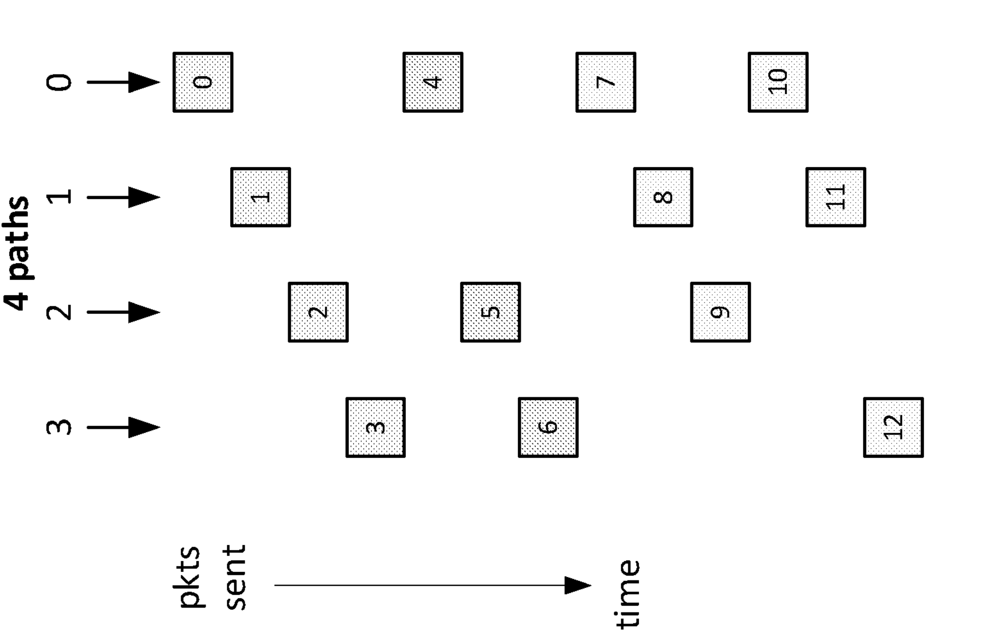
FIG. 10 shows an example of the Round Sequence Number (RSN) and Last Round Distribution (LRD) generated at a source node.

FIG. 10 shows an example of the RSN and LRD values generated and attached as metadata to the packets as they are distributed over 4 paths. The example sequence of events proceeds from top to bottom chronologically. In the example packet 7 would have the RSN value of 2 and the LRD value of 4'b1101. In the first round (RSN=0) the LRD value is 4'b0000 since there was no previous packets sent. The "next LRD" value is state maintained by the source node S for a flow to a destination node D, which is used to generate the final LRD value.

Figure 11:
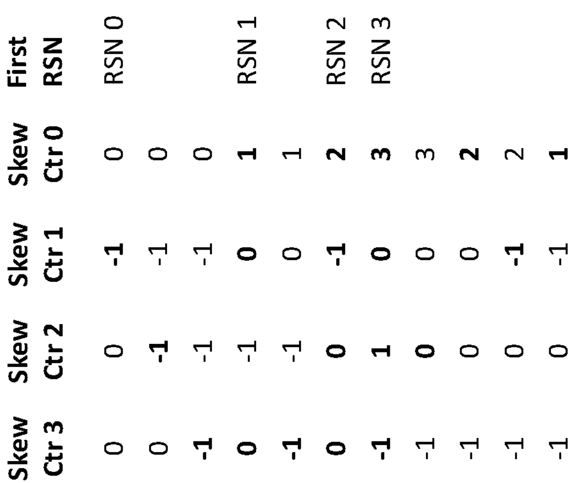
FIG. 11 shows an example of using the RSN and LRD to increment per-path skew counters at the destination node.
Figure 11:
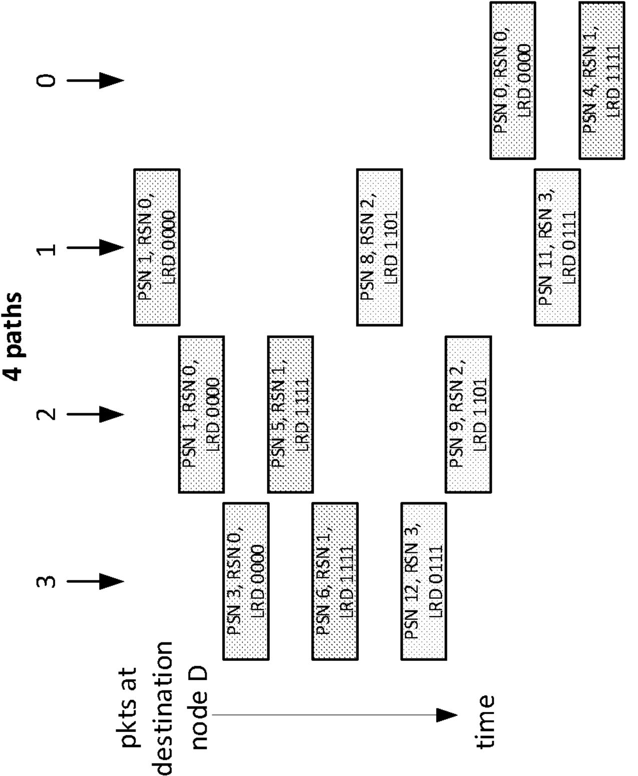

FIG. 11 continues the example in FIG. 10 by showing the destination node skew counters when the packets arrive out of order. Note that the counters may normally underflow negative due to the startup artifact sending the first round of packets without a previously signaled LRD. Since the packets on path 0 are delayed relative to the others, its skew counter reaches the value 3 detecting the relative difference in packet arrivals.

The Multipath Control Flits are sent immediately when a new window is being allocated, and then periodically to return the current skew counter and CPSN values. One optimization is to perform a lookup for the shortest available path to the original source node, to speed up the signaling process. A caching mechanism may also be employed to reduce the number of path lookups required when the path status is unchanged.

FIG. 2 shows one possible embodiment of the multipath distribution function. The multipath control flits are unpacked into the CPSN and path skew counters at the source node. The CPSN value represents the last known packet that was read from destination node memory and sent to its host. The difference between the source node's PSN value and latest CPSN represents the number of packets that are in the source node buffering beyond the MPP distribution point, in-flight in the network, or stored in the reorder window and destination memory pool, less an amount representing the MCF signaling delays. The source node can use this calculation to limit the total number of packets committed to be sent and reordered, thus preventing overflow of the available reorder window space. The source node may, for example, buffer packets before the path distribution process, or assert backpressure upstream towards the host.

Also shown in FIG. 2, item 16 represents the function to convert the MCF skew counter values into per-path weights to be used by the source node path distribution function. One possible embodiment of the function which minimizes the amount of per-destination states to be maintained in the source node proceeds as follows:

1. For each multipath flow to a given destination, maintain a set of per-path, weight counters using, for example, 8-bit binary math, with 3-bits of integers and 5 fractional bits.
2. By default, set the weights to all-ones values.
3. On each MCF arrival, update the calculated weight values.
4. Set a programmable skew threshold (MIN_SKEW_THR) used to denote an expected static skew between paths based on the expected differences in hop counts through the network.
5. If the skew exceeds a configurable max skew threshold (MAX_SKEW_THR) then the path weight should be set to zero.
6. If the received MCF skew is above the threshold the weight will ramp down over time with successive MCF updates, while if it is below the threshold it will ramp upwards. The new path weight can be calculated as:
   Where:
   L=line rate
   Ku=upwards control gain (0<Ku<<1)
   Kd=downward control gain (0<Kd<<1)
   E=Minimum rate (0<E<<L, e.g. L/16)
   If skew ctr<MIN_SKEW_THR
   Weight=weight×(1−Ku)+(L×Ku)
   Else
   Weight=weight×(1−Kd)+(E×Kd)
7. The integer values of the per-path weights are passed to the packet distribution function.

The following Table shows some example calculations using 8-bit fractional math, where the target weight in each row is recalculated in the next row using the equations above, depending on whether the received skew value is below or above the MIN_SKEW_THR. For clarity, the values are shown in both binary and as the number of 1/32 fractions. Using the constant values:

Ku=000.00011 (3/32)
Kd=000.00100 (4/32)
E=000.01000 (8/32)

| Received skew >= Threshold | Target Weight (binary) | Target Weight (1/32 s) | Change (1/32 s) |
|---|---|---|---|
| 1 | 110.01000 | 200 | −27 |
| 1 | 101.10000 | 176 | −24 |
| 1 | 100.11011 | 155 | −21 |
| 1 | 100.01001 | 137 | −18 |
| 1 | 011.11001 | 121 | −16 |
| 1 | 011.01011 | 107 | −14 |
| 1 | 010.11111 | 95 | −12 |
| 1 | 010.10101 | 85 | −10 |
| 1 | 010.01100 | 76 | −9 |
| 1 | 010.00100 | 68 | −8 |
| 1 | 001.11101 | 61 | −7 |
| 0 | 010.01111 | 79 | 18 |
| 0 | 010.11111 | 95 | 16 |
| 0 | 011.01110 | 110 | 15 |
| 0 | 011.11011 | 123 | 13 |

The source node packet distribution function may use any well-known technique such as a weighted round-robin to distribute the packets over the paths using the per-path target weights.

All the data structures such as reorder window size, number of paths in use, MCF transmission frequency, etc., and the configuration parameters described above must be adjusted appropriately based on the system parameters such as the number of hops in each path, the line rate on each link, and the ranges and distribution of packet sizes.

In terms of deployment, in one embodiment the methods described herein may be used in association with a direct interconnect network, such as, for example, those implemented in accordance with U.S. Pat. Nos. 9,965,429 and 10,303,640 to Rockport Networks Inc., the disclosures of which are incorporated in their entirety herein by reference. U.S. Pat. Nos. 9,965,429 and 10,303,640 describe systems that provide for the easy deployment of direct interconnect network topologies and disclose a novel method for managing the wiring and growth of direct interconnect networks implemented on torus or higher radix interconnect structures.

The systems of U.S. Pat. Nos. 9,965,429 and 10,303,640 involve the use of a passive patch panel having connectors that are internally interconnected (e.g. in a mesh) within the passive patch panel. In order to provide the ability to easily grow the network structure, the connectors are initially populated by interconnect plugs to initially close the ring connections. By simply removing and replacing an interconnect plug with a connection to a node, the node is discovered and added to the network structure. If a person skilled in the art of network architecture desired to interconnect all the nodes in such a passive patch panel at once, there are no restrictions—the nodes can be added in random fashion. This approach greatly simplifies deployment, as nodes are added/connected to connectors without any special connectivity rules, and the integrity of the torus structure is maintained.

In another preferred embodiment, the methods disclosed herein may be used in association with devices that interconnect nodes in a direct interconnect network (i.e. shuffles) as described in PCT Publication No. WO 2022/096927 A1 to Rockport Networks Inc., the disclosure of which is incorporated in its entirety herein by reference. The shuffles described therein are novel optical interconnect devices capable of providing the direct interconnection of nodes in various topologies as desired (including torus, dragonfly, slim fly, and other higher radix topologies for instance) by connecting fiber paths from a node(s) to fiber paths of other node(s) within an enclosure to create optical channels between the nodes. This assists in optimizing networks by moving the switching function to the endpoints. The optical paths in the shuffles of PCT Publication No. WO 2022/096927 A1 are pre-determined to create the direct interconnect structure of choice, and the internal connections are preferably optimized such that when nodes are connected to a shuffle in a predetermined manner an optimal direct interconnect network is created during build-out.

The nodes themselves may potentially be any number of different devices, including but not limited to processing units, memory modules, I/O modules, PCIe cards, network interface cards (NICs), PCs, laptops, mobile phones, servers (e.g. application servers, database servers, file servers, game servers, web servers, etc.), or any other device that is capable of creating, receiving, or transmitting information over a network. As an example, in one preferred embodiment, the node may be a network card, such as a Rockport RO6100 Network Card, as described in PCT Publication No. WO 2022/096927 A1. Such network cards are installed in servers, but use no server resources (CPU, memory, and storage) other than power, and appear to be an industry-standard Ethernet NIC to the Linux operating system. Each Rockport RO6100 Network Card supports an embedded 400 Gbps switch (twelve 25 Gbps network links; 100 Gbps host bandwidth) and contains software that implements the switchless network over the shuffle topology (see e.g. the methods of routing packets in U.S. Pat. Nos. 10,142,219 and 10,693,767 to Rockport Networks Inc., the disclosures of which are incorporated in their entirety herein by reference).

Although specific embodiments of the invention have been described, it will be apparent to one skilled in the art that variations and modifications to the embodiments may be made within the scope of the following claims.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

I claim:

1. A method of routing a flow of packets from a source node to a destination node, the method comprising:

(a) commencing routing packets in a flow of packets from a source node to a destination node along multiple pathways, and including metadata with the packets describing the routing distribution of the packets along the multiple pathways, said metadata comprising a number of packets sent on each pathway within the multiple pathways, a Last Round Distribution (LRD) vector indicating paths used in a previous round of packet distribution, and a Round Sequence Number (RSN) that is incremented with each new round;

(b) monitoring relative packet skew between the multiple pathways at the destination node, wherein the destination node counts the number of packets that arrive on each pathway within the multiple pathways, compares the number of packets that arrive on each pathway to the number of packets sent on each pathway as per the metadata, and determining path skew status based on this comparison, wherein the path skew status comprises per-path skew counter values that are incremented based on the LRD for packets sent on each path and decremented for packets arriving on each path;

(c) using a backwards multipath control flit mechanism to send the path skew status from the destination node to the source node; and (d) implementing a weighted path distribution mechanism at the source node to dynamically reduce the use of or avoid any skewed pathways in the multiple pathways when routing packets from the source node to the destination node along multiple pathways.

2. The method of claim 1, wherein the LRD vector is a bit vector comprising one bit per pathway within the multiple pathways, each bit being set to indicate that a packet was sent on the corresponding pathway during the previous round of packet distribution and unset to indicate that no packet was sent on that pathway during the previous round.

3. The method of claim 1, wherein the destination node maintains an RSN tracking window comprising a bitmap in which each bit corresponds to a respective RSN value, wherein, upon receipt of a packet carrying an LRD for a given round, the destination node:

(a) marks the round as accepted for the corresponding RSN in the tracking window, (b) consumes only the first LRD received for each round regardless of which pathway it arrived on, and (c) ignores any subsequently received LRDs carrying the same RSN.

4. The method of claim 1, wherein determining path skew status further comprises, upon detection by a lost-packet mechanism that a packet has been lost on a given pathway, decrementing the per-path skew counter for that pathway, such that a declared lost packet is treated as equivalent to an arriving packet for purposes of skew counter accounting.

5. The method of claim 1, further comprising resetting all per-path skew counters at the destination node to an initial value when a reorder window is first allocated for the flow of packets.

6. The method of claim 1, wherein using a backwards multipath control flit mechanism to send the path skew status further comprises periodically transmitting the current per-path skew counter values from the destination node to the source node in successive multipath control flits.

7. The method of claim 1, wherein implementing a weighted path distribution mechanism comprises:

(a) maintaining a per-path weight value for each pathway within the multiple pathways; comparing the per-path skew counter value received from the destination node for each pathway to a programmable minimum skew threshold; and (b) setting the per-path weight value for a pathway to zero when the per-path skew counter value for that pathway exceeds a programmable maximum skew threshold, such that the source node ceases routing packets on that pathway.

8. The method of claim 7, wherein maintaining a per-path weight value further comprises:

(a) ramping the per-path weight value upward toward a maximum weight on each successive multipath control flit update when the per-path skew counter value for that pathway is at or below the programmable minimum skew threshold; and (b) ramping the per-path weight value downward toward a minimum weight on each successive multipath control flit update when the per-path skew counter value for that pathway exceeds the programmable minimum skew threshold.

9. The method of claim 1, further comprising:

(a) monitoring at the destination node whether the per-path skew counter value for any pathway within the multiple pathways exceeds a programmable excessive skew threshold; and (b) upon determining that the per-path skew counter value for a pathway exceeds the programmable excessive skew threshold, transmitting a restart request from the destination node to the source node via the backwards multipath control flit mechanism to reset the multipath flow.

10. The method of claim 1, wherein the backwards multipath control flit mechanism additionally carries a Credit Packet Sequence Number (CPSN) from the destination node to the source node, said CPSN indicating the packet sequence number of the last packet read from a receive packet buffer memory at the destination node.

11. The method of claim 10, further comprising:

(a) at the source node, comparing the CPSN received from the destination node to a latest packet sequence number for packets sent from the source node to the destination node; and (b) using the difference between the CPSN and the latest packet sequence number as a measure of the number of packets queued in the source node, in-flight in the network, or queued in a destination node reorder window, to limit the total number of packets committed to be routed along the multiple pathways and prevent overflow of the reorder window at the destination node.

* * * * *